United States Patent
Meckes et al.

(10) Patent No.: US 6,990,991 B2
(45) Date of Patent: Jan. 31, 2006

(54) SAFETY DEVICE FOR A GAS DISTRIBUTION SYSTEM IN AN AIRPLANE AND GAS DISTRIBUTION METHOD

(75) Inventors: Rüdiger Meckes, Berkenthin (DE); Herbert Meier, Lübeck (DE); Wolfgang Rittner, Siblin (DE)

(73) Assignee: Dräger Aerospace GmbH, Lübeck (DE)

( * ) Notice: Subject to any disclaimer, the term of this patent is extended or adjusted under 35 U.S.C. 154(b) by 301 days.

(21) Appl. No.: 10/365,899

(22) Filed: Feb. 13, 2003

(65) Prior Publication Data
US 2003/0196707 A1 Oct. 23, 2003

(30) Foreign Application Priority Data
Apr. 19, 2002 (DE) .......... 102 17 499

(51) Int. Cl.
*F16K 17/04* (2006.01)
*B64D 11/00* (2006.01)

(52) U.S. Cl. .......... 137/1; 137/505.11; 137/512; 137/614.2

(58) Field of Classification Search .......... 137/1, 137/505.11, 601.2, 512, 512.1, 614.2, 599.09, 137/505.09; 244/118.5
See application file for complete search history.

(56) References Cited

U.S. PATENT DOCUMENTS

| | | | | |
|---|---|---|---|---|
| 2,645,243 A | * | 7/1953 | Turner | 137/512 |
| 2,694,407 A | * | 11/1954 | Jobson | 137/112 |
| 2,934,293 A | | 4/1960 | Boehme et al. | |
| 3,211,175 A | * | 10/1965 | Replogle | 137/493 |
| 3,742,972 A | * | 7/1973 | Hughes | 137/110 |
| 4,148,311 A | * | 4/1979 | London et al. | 128/204.26 |
| 5,158,107 A | * | 10/1992 | Teay | 137/460 |
| 5,357,949 A | | 10/1994 | Bertheau et al. | |
| 5,520,214 A | * | 5/1996 | Mack et al. | 137/505.34 |
| 6,223,774 B1 | | 5/2001 | Fournier et al. | |

FOREIGN PATENT DOCUMENTS

EP 0 298 272 1/1989

* cited by examiner

*Primary Examiner*—Stephen M. Hepperle
(74) *Attorney, Agent, or Firm*—McGlew and Tuttle, P.C.

(57) ABSTRACT

A safety device is provided for a gas distribution system in an airplane, containing at least one pressure regulator (5) between a pressurized gas source (2) and a supply line. Reliability of operation is improved with the provision of a pressure-limiting device (4) with two lines (41, 42) arranged in parallel with two pressure-limiting valves (43, 44, 45, 46) each arranged in the same direction in series. The pressure-limiting device (4) is arranged upstream of the pressure regulator (5).

16 Claims, 3 Drawing Sheets

SAFETY DEVICE FOR A GAS DISTRIBUTION SYSTEM IN AN AIRPLANE AND GAS DISTRIBUTION METHOD

FIELD OF THE INVENTION

The present invention pertains to a safety device for a gas distribution system in an airplane, containing at least one pressure reducer between a pressurized gas source and a supply line.

BACKGROUND OF THE INVENTION

A device for supplying the passengers and the crew with oxygen has become known from U.S. Pat. No. 2,934,293. Based on individual pressurized oxygen cylinders, which are connected to one another via a line system, the oxygen is sent into supply lines via pressure-reducing valves. The supply lines extending to the left and right of the rows of passengers are branched off from a distributor and are connected to emergency oxygen supply means, which are located next to the passenger seats. Supply lines for oxygen with separate pressure regulators are additionally provided for the pilots and the crew.

Pressure-reducing valves, which are connected to one another via individual pressure relief lines, are provided at the pressurized gas cylinders in the prior-art gas distribution systems, and excess gas is blown off via a common gas outlet to eliminate pressure peaks. A corresponding number of pressure-limiting valves, which must be maintained individually, are also needed in light of a large number of pressurized gas cylinders. Such pressure relief valves are usually connected in one assembly unit to a cylinder pressure reducer located on the pressurized gas cylinder. The housing of the cylinder pressure reducer has a separate outlet connection, via which the gas flowing from the pressure relief valve is drawn off. Such a cylinder pressure reducer is shown, e.g., in EP 298 272 A2.

SUMMARY OF THE INVENTION

The basic object of the present invention is to improve a safety device of the type described in terms of its reliability of operation.

According to the invention, a safety device for a gas distribution system in an airplane is provided containing at least one pressure reducer between a pressurized gas source and a supply line. A pressure-limiting means is arranged upstream of the pressure regulator. The pressure-limiting means has two lines arranged in parallel with two pressure-limiting valves each arranged in the same direction in series.

The safety device described in the present invention has the advantage that only a single pressure-limiting means, which is designed as a doubly redundant pressure-limiting means and replaces the individual valves, is needed for a battery of individual pressurized gas cylinders.

Two identical pressure-limiting valves are arranged here in lines connected in parallel such that flow is possible through each line in the same direction. The pressure-limiting means is located between the pressurized gas sources and the pressure reducer and is used to limit the admission pressure to the pressure regulator. The pressure-limiting function of the pressure-limiting means is guaranteed by the partially parallel and serial arrangement of the pressure-limiting valves both in case of failure of one of the pressure-limiting valves and in case of failure of a single pressure-limiting valve in each of the lines connected in parallel. The possible cases of error, such as jamming of a pressure-limiting valve in the open or closed position, are thus covered. The pressure regulator, which is provided with the pressure-limiting means, is located with respect to the flow behind the cylinder pressure reducers, which are screwed onto the pressurized gas cylinders, and they reduce the pressure in the cylinder to the so-called center pressure.

The pressure-limiting valves are advantageously designed as spring-loaded nonreturn valves opening at a predetermined limit pressure. The nonreturn valves are advantageously designed such that they have the same limit pressure.

Two pressure regulators connected in parallel, which operate independently from one another as altitude-controlled differential pressure regulators, are advantageously provided as pressure regulators. The pressure profile rises linearly from 400 mbar to 6,800 mbar in the altitude range of 10,000 ft. to 40,000 ft. The gas supply for the supply lines is guaranteed by the parallel connection of the pressure regulators even in case of failure of one of the pressure regulators.

An advantageous application of a pressure-limiting valve according to another aspect of the invention includes a method of gas distribution in an airplane gas distribution system using a pressure-limiting means with two parallel lines with two pressure-limiting valves each arranged in the same direction in series.

An exemplary embodiment of the present invention is shown in the drawings and will be explained in greater detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
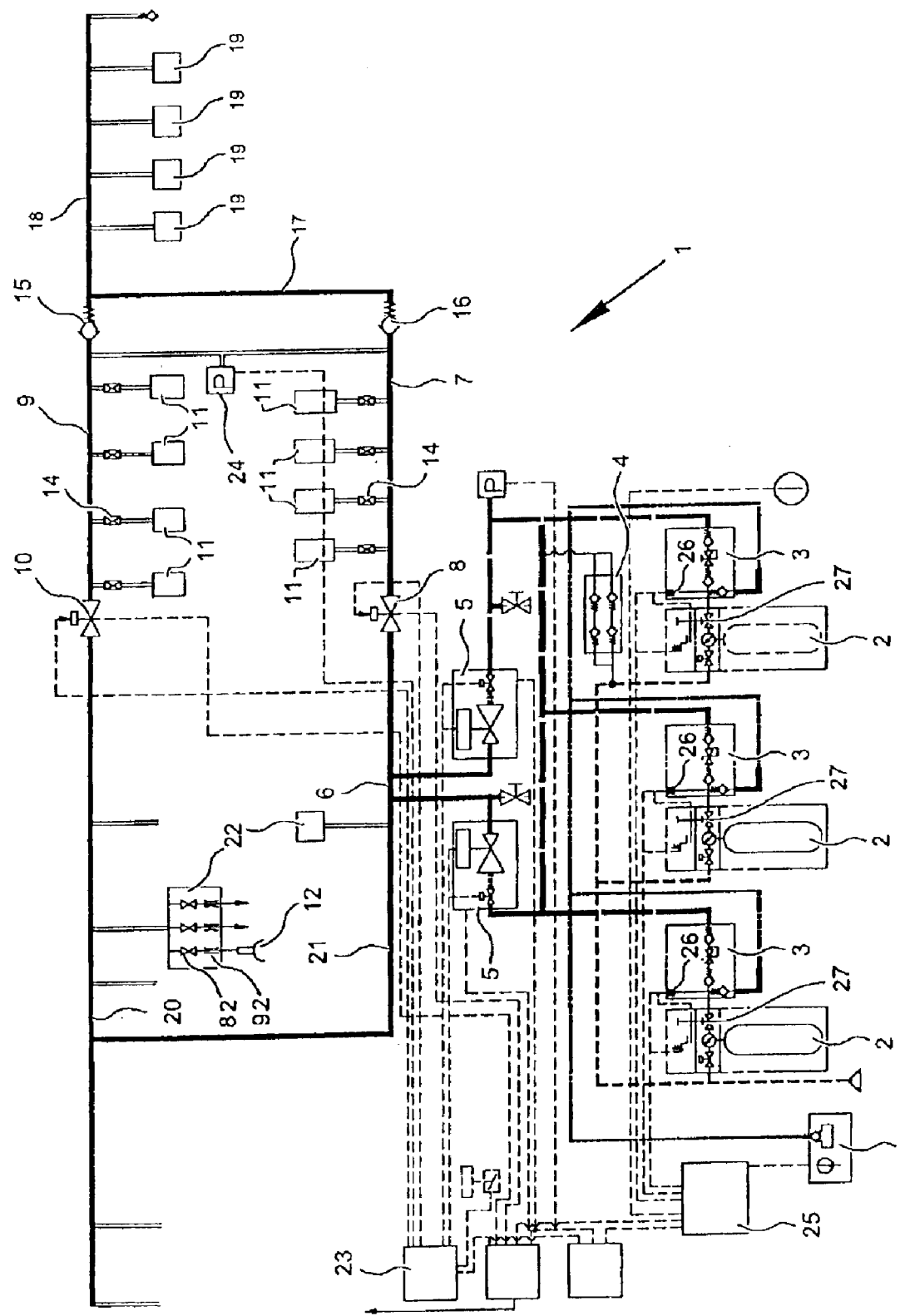
FIG. 1 schematically shows a gas distribution system.

Referring to the drawings in particular, FIG. 1 schematically shows a gas distribution system 1 for oxygen in an airplane, which airplane is not specifically shown in FIG. 1. The system has three pressurized gas cylinders 2 for oxygen as the pressurized gas source and downstream cylinder pressure reducers 3, a pressure-limiting means 4, two pressure regulators 5 connected in parallel, and a branching site 6, from which a first supply line 7 is supplied with oxygen via a first shut-off valve 8 and a second supply line 9 is supplied with oxygen via a second shut-off valve 10. Emergency oxygen supply means 11 with breathing masks 12 and flow-limiting valves 14 are located at the supply lines 7, 9. When the emergency oxygen supply means 11 are activated, the flow of gas into the breathing masks 12 is also released via shut-off valves 82 and gas-metering means 92. The free ends of the supply lines 7, 9 are connected via a first nonreturn valve 16 and a second nonreturn valve 15 to a return line 17 and to a third supply line 18, at which emergency oxygen supply means 19 are likewise located.

A fourth supply line 20 and a fifth supply line 21, which likewise supply oxygen to emergency oxygen supply means 22, extend in the front part of the airplane, which is not shown specifically.

The first supply line 7 and the second supply line 9 are located at the level of the engines, i.e., at the level of the so-called "engine burst area."

An evaluating device 23 is connected to the shut-off valves 8, 10, the pressure regulators 5 as well as a pressure-measuring means 24 determining the pressure between the supply lines 7, 9. A central computer unit 25, which performs all control and monitoring tasks, receives control and measured signals from the control means 24 and from limit switches 26, which are located at shut-off valves 27 of the pressurized gas cylinders 2.

The gas distribution system 1 described in the present invention operates as follows:

After the opening of the shut-off valves 27 at the pressurized gas cylinders 2, the central computer unit 25 receives the information via the limit switches 26 that the oxygen supply is ready to operate. Pressure is admitted to the supply lines 7, 9, 18, 20 and 21 via the cylinder pressure reducers 3, the pressure regulators 5 and the branching site 6 in case of decompression of the cabin, so that the emergency oxygen supply means 11, 19, 22 are ready for use. The differential pressure between the first supply line 7 and the second supply line 9 is measured with the pressure-measuring means 24. The shut-off valves 8, 10 are also opened during normal operation. Thus, essentially the same pressure prevails in the supply lines 7, 9, 18, 20, 21, so that the evaluating device 23 receives the information from the pressure-measuring means 24 that there is no differential pressure. Even though a pressure drop does occur within the entire system because of the removal of gas when the emergency oxygen supply means 11, 19, 22 is switched on, no appreciable differential pressure is measured as yet between the supply lines 7, 9 because of the essentially equal number of breathing masks within the first supply line 7 and the second supply line 9.

If the first supply line 7 is damaged by an engine part flying around, which is not shown in FIG. 1, in the area of the supply lines 7, 9, i.e., in the area of the "engine burst area", the pressure-measuring means 24 detects a differential pressure because of the escaping oxygen, and the evaluating device 23 determines that the limit value of the differential pressure has been exceeded. The switching threshold for sending a closing signal to the first shut-off valve 8 is in a range between about 50 mbar and 200 mbar. The third supply line 18 is supplied with gas in this case via the second supply line 9 and the second nonreturn valve 15. The nonreturn valves 15, 16 are arranged in opposite directions in relation to one another, so that gas can flow off only from the supply lines 7, 9 into the return line 17 but not in the opposite direction.

Thus, there is no total loss of gas in case of damage to one of the supply lines 7, 9, but the intact supply lines 9, 18, 20, 21 can continue to be able to be supplied with oxygen. When the gas reserve of the pressurized gas cylinders 2 is depleted, these can be refilled via a central filling connection 13.

Figure 2:
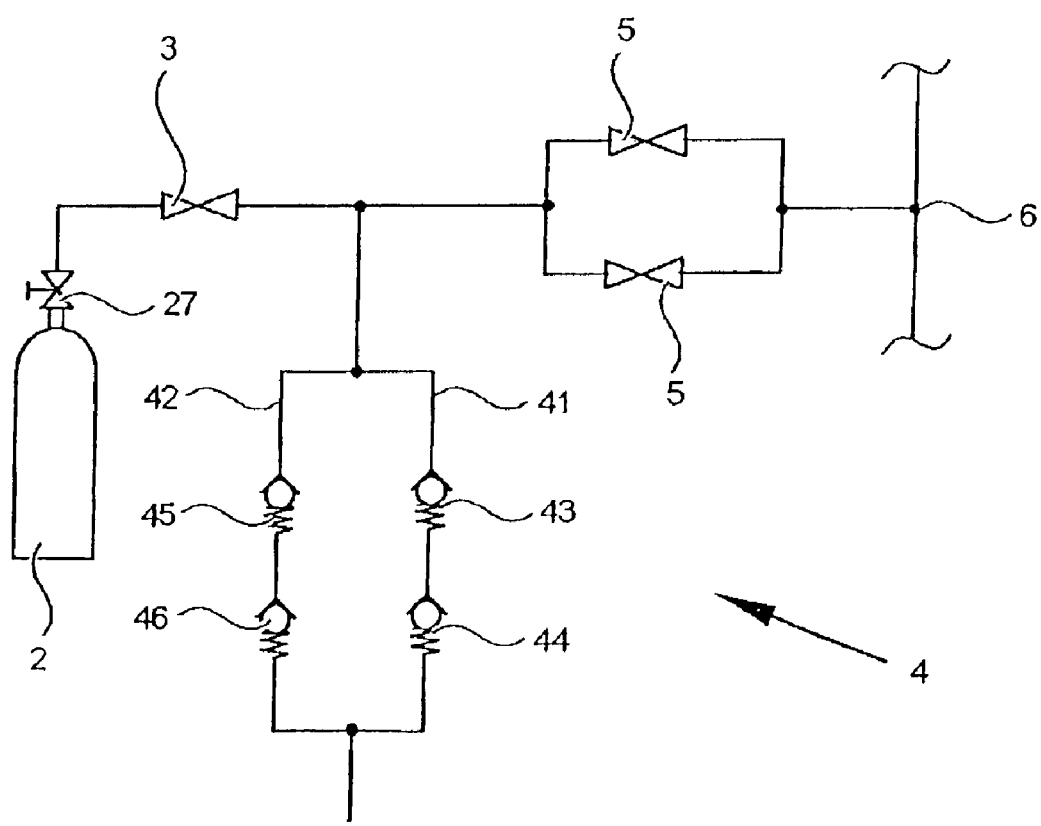
FIG. 2 shows a doubly redundant pressure-limiting means according to the present invention.

FIG. 2 schematically illustrates the design of the pressure-limiting means 4 according to the present invention between the cylinder pressure reducers 3 and the pressure regulators 5. Two nonreturn valves 43, 44 spring-loaded in the same direction are arranged in a first line 41, and a second line 42, which is connected in parallel to the first line 41, contains the nonreturn valves 45, 46. All nonreturn valves 43, 44, 45, 46 have the same opening pressure. If, e.g., the valve body in the nonreturn valve 43 is blocked, so that the valve cannot open, the overpressure is limited via the nonreturn valves 45, 46. If gas can flow freely through the nonreturn valve 43 as a consequence of a valve body jammed in the open position, the nonreturn valve 44 assumes the overpressure limitation. The overpressure limitation is also guaranteed via the remaining, intact nonreturn valves in case of failure of a nonreturn valve in one of the lines 41, 42 each. Besides the first case of error, the second case of error is also covered with the pressure-limiting means described in the present invention.

Figure 3:
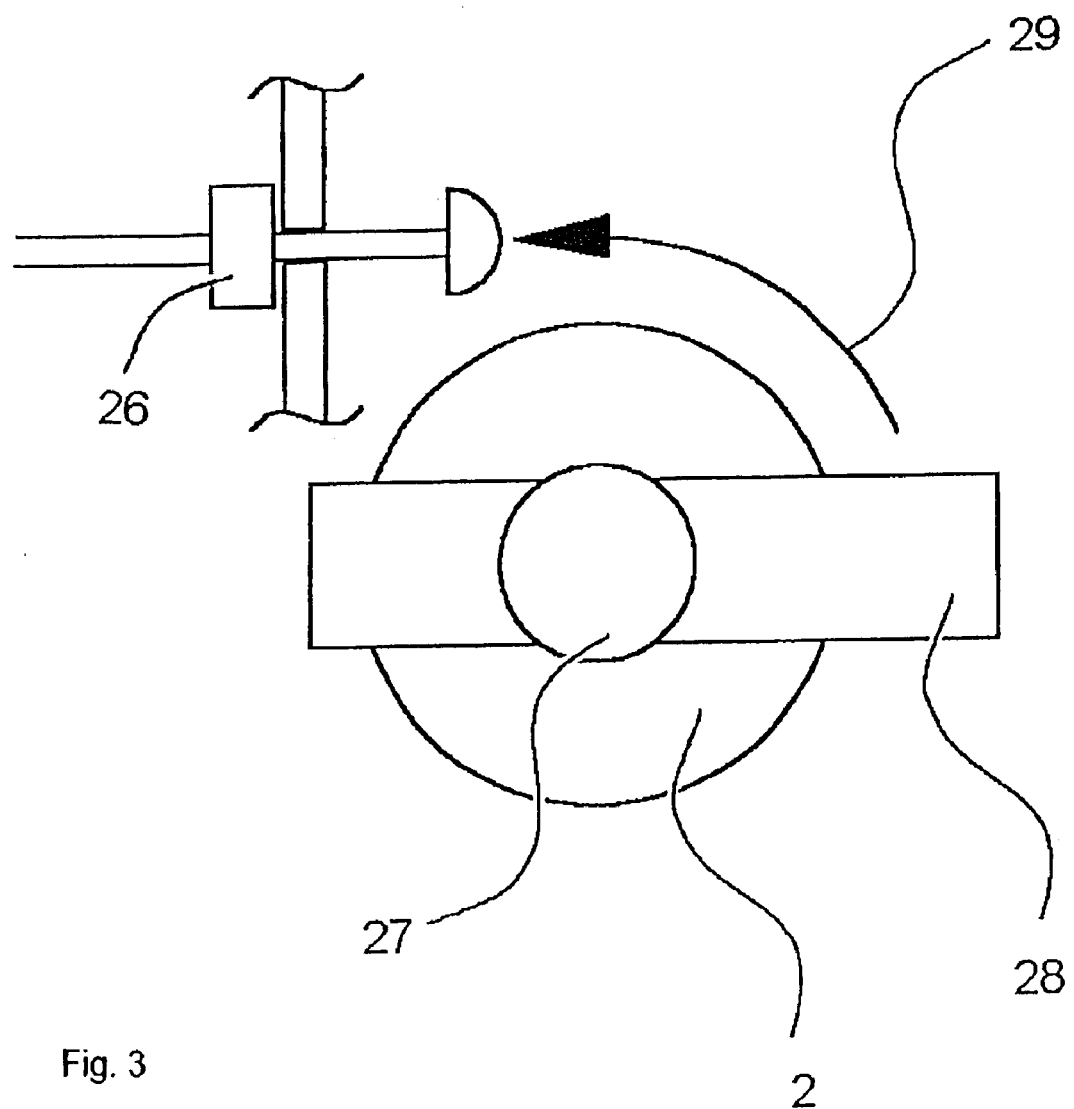
FIG. 3 shows a shut-off device on a pressurized gas cylinder with a limit switch.

FIG. 3 schematically illustrates the shut-off valve 27 with a handwheel 28 on the pressurized gas cylinder 2. If the handwheel 28 is rotated in the direction of arrow 29 into the open position, the reaching of the end position is detected with the limit switch 26. The central computer unit 25, FIG. 1, receives the information via the limit switch 26 that the corresponding shut-off valve 27 has been opened.

While specific embodiments of the invention have been shown and described in detail to illustrate the application of the principles of the invention, it will be understood that the invention may be embodied otherwise without departing from such principles.

What is claimed is:

1. A safety device for a gas distribution system in an airplane, the system comprising:
    a pressurized gas source;
    a supply line;
    a pressure regulator between said pressurized gas source and said supply line;
    a pressure-limiting means comprising two lines arranged in parallel, each of said lines being provided with two pressure-limiting valves each of said pressure-limiting valves being arranged in the same direction of pressure-limiting operation in series, said pressure-limiting means being arranged upstream of said pressure regulator.

2. A device in accordance with claim 1, wherein the pressure-limiting valves are spring-loaded nonreturn valves opening at a predetermined limit pressure.

3. A device in accordance with claim 2, wherein said nonreturn valves have the same limit pressure.

4. A device in accordance with claim 1, wherein two pressure regulators are connected in parallel and are provided as said pressure regulator.

5. A device in accordance with claim 2, wherein two pressure regulators are connected in parallel to serve as said pressure regulator.

6. A device in accordance with claim 3, wherein two pressure regulators are connected in parallel to serve as said pressure regulator.

7. A method of limiting pressure comprising:
    providing an airplane gas distribution system with a pressurized gas source, a supply line and a pressure regulator between said pressurized gas source and said supply line; and
    providing upstream of said pressure regulator two parallel flow lines defining two parallel flow paths with each of the lines having two pressure-limiting valves arranged in the same direction in series providing each of the parallel flow paths with two successive locations of pressure limitation.

8. An airplane gas distribution system, comprising:
    a pressurized gas source;
    a supply line;

a pressure regulator between said pressurized gas source and said supply line; and a pressure-limiting device with two lines arranged in parallel, each line having two pressure-limiting valves arranged in the same direction in series, said pressure-limiting device being arranged upstream of said pressure regulator.

9. A system in accordance with claim 8, wherein the pressure-limiting valves are spring-loaded nonreturn valves opening at a predetermined limit pressure.

10. A system in accordance with claim 9, wherein each of said nonreturn valves in one of said lines have the same limit pressure.

11. A device in accordance with claim 8, further comprising another pressure regulator connected in parallel with said pressure regulator.

12. A system in accordance with claim 9, further comprising another pressure regulator connected in parallel with said pressure regulator.

13. A system in accordance with claim 10, further comprising another pressure regulator connected in parallel with said pressure regulator.

14. A device according to claim 1, further comprising emergency oxygen supply means for supplying emergency oxygen to a passenger, wherein said supply line is connected to said emergency oxygen supply means.

15. A method according to claim 7, further comprising providing an emergency oxygen supply means connected to said supply line for use in supplying emergency oxygen to a passenger.

16. A system according to claim 8, further comprising a plurality of emergency oxygen supply means each for supplying emergency oxygen to a passenger, wherein said supply line is connected to each of said emergency oxygen supply means.

* * * * *